(12) United States Patent
Sukigara et al.

(10) Patent No.: US 7,175,917 B2
(45) Date of Patent: Feb. 13, 2007

(54) BIAXIALLY ORIENTED POLYLACTIC ACID-BASED RESIN FILMS

(75) Inventors: Masayuki Sukigara, Suzuka (JP); Mitsuyoshi Itada, Suzuka (JP); Hisao Koike, Kameyama (JP); Michihiro Yatsuzuka, Suzuka (JP); Yoshiaki Hamada, Suzuka (JP)

(73) Assignee: Asahi Kasei Life & Living Corporation, Tokyo (JP)

( * ) Notice: Subject to any disclaimer, the term of this patent is extended or adjusted under 35 U.S.C. 154(b) by 0 days.

(21) Appl. No.: 10/493,387

(22) PCT Filed: Oct. 29, 2002

(86) PCT No.: PCT/JP02/11211

§ 371 (c)(1),
(2), (4) Date: Apr. 23, 2004

(87) PCT Pub. No.: WO03/037966

PCT Pub. Date: May 8, 2003

(65) Prior Publication Data

US 2005/0008815 A1    Jan. 13, 2005

(30) Foreign Application Priority Data

Nov. 1, 2001   (JP) ............................ 2001-336150

(51) Int. Cl.
| | |
|---|---|
| *B29D 7/00* | (2006.01) |
| *B29C 39/14* | (2006.01) |
| *B29C 41/24* | (2006.01) |
| *B29C 43/22* | (2006.01) |

(52) U.S. Cl. ...................... 428/480; 528/355; 528/358; 528/359; 528/363; 525/411; 525/413; 525/408; 264/165; 428/98; 428/220; 523/124

(58) Field of Classification Search ................ 528/354, 528/355, 358, 359, 363; 525/411, 413; 264/165; 428/480, 98, 220; 523/124

See application file for complete search history.

(56) References Cited

U.S. PATENT DOCUMENTS

| | | | | |
|---|---|---|---|---|
| 5,443,780 A | | 8/1995 | Matsumoto et al. | |
| 5,536,807 A | * | 7/1996 | Gruber et al. | 528/354 |
| 5,773,562 A | * | 6/1998 | Gruber et al. | 528/354 |
| 6,093,791 A | * | 7/2000 | Gruber et al. | 528/354 |
| 6,121,410 A | * | 9/2000 | Gruber et al. | 528/354 |
| 6,323,308 B1 | * | 11/2001 | Kobayashi et al. | 528/354 |
| 6,960,374 B1 | * | 11/2005 | Terada et al. | 428/35.7 |
| 6,984,443 B2 | * | 1/2006 | Kuroki et al. | 428/220 |

FOREIGN PATENT DOCUMENTS

| | | | |
|---|---|---|---|
| EP | 1 449 867 A1 | * | 8/2004 |
| JP | 6-156508 A | | 6/1994 |
| JP | 8-73628 A | | 3/1996 |
| JP | 8-198955 A | | 8/1996 |
| JP | 2000-198913 A | | 7/2000 |
| JP | 2001-64413 A | | 3/2001 |
| JP | 2001-122989 A | | 5/2001 |
| JP | 2001-354789 A | | 12/2001 |
| JP | 2002 113776 A | | 4/2002 |
| JP | 2002-292665 A | | 10/2002 |
| WO | WO 90/1521 A1 | | 2/1990 |
| WO | WO 01/10928 A1 | | 2/2001 |

OTHER PUBLICATIONS

"Window Envelope Film From Polylactic Acid Polymer"; Research Disclosure, Kenneth Mason Publications, Hampshire, GB., No. 426, p. 1310 (Oct. 1999).

* cited by examiner

*Primary Examiner*—P. Hampton Hightower
(74) *Attorney, Agent, or Firm*—Birch, Stewart, Kolasch & Birch, LLP

(57) ABSTRACT

The present invention provides a biaxially oriented film of a polylactic acid resin that is suitable for films for bags and packaging films for various windows, particularly films for outlook window envelopes. The film is biodegradable and, as films for outlook window envelopes, is superior in the coating adaptability for an antistatic agent, a lubricant and an antiblocking agent or the like and in the high-speed cutting property.

The present invention discloses a biaxially oriented film of a polylactic acid resin comprising not less than 50% by weight of a polylactic acid resin, which has a storage modulus E' at 80° C. within the range from 10 MPa to 3,000 MPa, as determined by the test method for temperature dependency of dynamic viscoelasticity, in accordance with JIS K7198 (method A); a heat shrinkage of not higher than 10%, upon heating at 80° C. for 10 seconds; and a tear strength in the width direction (TD direction) of the film of 10 to 200 mN, as determined in accordance with JIS K7128 (method B).

9 Claims, No Drawings

BIAXIALLY ORIENTED POLYLACTIC ACID-BASED RESIN FILMS

TECHNICAL FIELD

The present invention relates to a biodegradable biaxially oriented film consisting mainly of a polylactic acid resin. More specifically, the present invention relates to a biodegradable film for bags, packaging and for various windows with superior coating adaptability and high-speed cutting property.

BACKGROUND ART

Synthetic polymer compounds have been widely used as plastics due to their superior characteristics. With the increase in the consumption of the synthetic polymer compounds, however, the amount of waste has been also increasing. It has thus become a social problem how the waste plastics should be dealt with. Incineration causes problems, such as the damage to furnaces due to high heat generation and the risk of emission of toxic substances. Landfill also cause a problem that the plastics stay in the environment for good since they do not decay. Furthermore, considering the costs of classification, collection and regeneration, it is difficult to completely solve the problem only by recycling.

In the midst of such increasing environmental concern, needs for biodegradable plastics which decompose in the natural environment after being wasted have been increasing to reduce environmental load and to realize the sustainable society.

Known biodegradable plastics include starch-based ones, aliphatic-polyester resins produced by microorganisms, chemically synthetic aliphatic polyester resins and the same resins but partially modified in their chemical structure, and biodegradable aliphatic aromatic polyester resins.

Among these biodegradable plastics, polylactic acid resins have superior transparency, rigidity and processability, as compared with other biodegradable plastics. In particular, oriented films of polylactic acid resins are suitable as various films for packaging such as bags, window films for containers with window, plastering films for outlook window envelopes, substitute films for cellophane, and the like, due to their high stiffness and high transparency.

On the other hand, in the field of plastic film applications, processing speed has been increasing with the progress of processing machinery. For example, in the affixing of films for envelope windows, recent processing speed is 800 to 1,000 sheets/minute, or even 1000 or more sheets/minute due to the progress of window affixing machine, while the conventional processing speed was 400 to 600 sheets/minute. For this reason, running speed of the film also has been increasing and thus there are needs for a film with superior high-speed cutting property. In addition, there are applications in which film surface is to be coated with an antistatic agent, a lubricant, an antiblocking agent, or the like, to provide the film with machine adaptability and processability to suit the high-speed processing. For example, the above-described coating is indispensable in bags, packaging films and films for various windows, particularly those for window of outlook window envelopes into which relatively light weight materials easily affected by static electricity, such as powder, granule, thin papers, film, fiber-like substance, are contained. Therefore, the films are required to have coating adaptability, in addition to the high-speed cutting property. Biodegradable films, in particular polylactic acid film, with superior transparency and mechanical properties, satisfying these requirements have not been obtained.

JP-A-2001-122989 discloses that a biaxially oriented polylactic acid polymer film consisting of crystalline polylactic acid and having the storage modulus E' at 120° C. within the range from 100 MPa to 230 MPa, as determined by the test method for temperature dependency of dynamic viscoelasticity, is suitable for fold-packaging due to superior tacking property. This film, however, cannot satisfy the coating adaptability and high-speed cutting property. JP-A-2000-198913 discloses an easily tearable, biaxially oriented film of a polylactic acid resin consisting of polylactic acid and crystalline aliphatic polyester. This film, however, only has limited applications due to significant haze. JP-A-2001-64413 discloses an easily tearable, biaxially oriented film of a polylactic acid resin consisting of polylactic acid and polyethylene terephthalate and/or polyethylene isophthalate. This film, however, only has limited applications due to incomplete biodegradability and insufficient coating adaptability and high-speed cutting property, although it is superior in straight tearing and hand tearing properties. JP-A-2001-354789 also discloses biodegradable polylactic acid resin films with a good balance among antistatic property, lubricity and antiblocking property, along with superior adhesion to paper. This film, however, does not have the high-speed cutting property.

The object of the present invention is to provide a biodegradable, biaxially oriented film of a polylactic acid resin suitable for films for bags, packaging and films for various windows with superior coating adaptability for antistatic agents, lubricants, antiblocking agents or the like, as well as high-speed cutting property.

DISCLOSURE OF THE INVENTION

The present inventors have found, after extensive studies to solve the above-described problems, that a biodegradable, biaxially oriented film of a polylactic acid resin, which is suitable for films for bags, packaging and films for various windows with superior coating adaptability as well as high-speed cutting property, can be obtained by making the storage modulus E' at 80° C., as determined by the test method for temperature dependency of dynamic viscoelasticity, in accordance with JIS K7198 (method A), the heat shrinkage at 80° C. and the tear strength in the width direction (TD direction) of a film within the specific ranges, respectively, despite the fact that the physical properties of the film are complicatedly influenced by its blend composition of crystalline polylactic acid and amorphous polylactic acid, drawing temperatures and drawing ratios in the MD and TD directions, and heat treatment conditions and the like. Based on these findings, the present invention has been accomplished.

Namely, the present invention comprises the following aspects:

(1) A biaxially oriented film of a polylactic acid resin comprising not less than 50% by weight of a polylactic acid resin, which has a storage modulus E' at 80° C., in at least one of a longitudinal direction (MD direction) and a width direction (TD direction) of the film, of from 10 MPa to 3,000 MPa, as determined by the test method for temperature dependency of dynamic viscoelasticity in accordance with JIS K7198 (method A);

a heat shrinkage of not higher than 10%, upon heating at 80° C. for 10 seconds; and a tear strength in the width direction (TD direction) of 10 to 200 mN, as determined in accordance with JIS K7128 (method B).

(2) The biaxially oriented film of a polylactic acid resin in accordance with (1), wherein the storage modulus E' at 80° C., in at least one of the longitudinal direction (MD direction) and the width direction (TD direction) of the film, is within the range from 50 MPa to 1,000 MPa, as determined by the test method for temperature dependency of dynamic viscoelasticity.

(3) The biaxially oriented film of a polylactic acid resin in accordance with (1) or (2), wherein the storage modulus E' at 80° C., in at least one of the londitudinal direction (MD direction) and the width direction (TD direction) of the film, is within the range from 10 MPa to 300 MPa, as determined by the test method for temperature dependency of dynamic viscoelasticity; and a heat of fusion, $\Delta Hm$, at the crystal melting peak, present at a temperature not lower than 100° C., is in the range from 15 to 30 J/g, as determined by a differential scanning calorimeter (DSC) with a temperature being increased from 0° C. to 200° C. in accordance with JIS K7122.

(4) The biaxially oriented film of a polylactic acid resin in accordance with (1) or (2), wherein the polylactic acid resin is a mixture comprising of 95 to 60 parts by weight of crystalline polylactic acid with an optical purity of not lower than 85% and 5 to 40 parts by weight of amorphous polylactic acid with an optical purity of not higher than 80%.

(5) A window for an outlook window envelope, comprising the biaxially oriented film of a polylactic acid resin in accordance with (1) or (2).

(6) The biaxially oriented film of a polylactic acid resin in accordance with (1) or (2), wherein said film is drawn at a ratio of not less than 4 in the width direction (TD direction) of the film, and is subjected to a heat treatment at a temperature not lower than the glass transition temperature (Tg) thereof and not higher than the melting point (Tm) thereof.

(7) A method for producing a biaxially oriented film of a polylactic acid resin, comprising:

drawing a film comprising a resin containing not less than 50% by weight of a mixture comprising 95 to 60 parts by weight of crystalline polylactic acid with an optical purity of not lower than 85% and 5 to 40 parts by weight of amorphous polylactic acid with an optical purity of not higher than 80%, at a ratio of not less than 4 in the width direction (TD direction) of the film; and subsequently subjecting the film to a heat treatment at a temperature not lower than the glass transition temperature (Tg) thereof and not higher than the melting point (Tm) thereof.

PREFERRED EMBODIMENTS OF THE INVENTION

The present invention will be explained in more detail hereinbelow.

A film of the present invention comprises not less than 50% by weight, preferably not less than 70% by weight, more preferably not less than 85% by weight, and further more preferably 100% by weight of, a polylactic acid resin. If the content of a polylactic acid resin is less than 50% by weight, the elastic modulus and transparency of PLA tend to be lowered. Said polylactic acid resin means: a copolymer of polylactic acid or lactic acid and other hydroxycarboxylic acid(s), aliphatic cyclic ester(s), dicarboxylic acid(s) and/or diol(s), containing not less than 85% by weight of lactic acid monomer units; or a composition of these polymers containing not less than 85% by weight of lactic acid monomer units.

Lactic acid has L-lactic acid and D-lactic acid as optical isomers, and polylactic acid obtained by polymerization of lactic acid includes crystalline polylactic acid and amorphous polylactic acid. The former comprises about 10% or less of D-lactic acid units and about 90% or more of L-lactic acid units, or about 10% or more of L-lactic acid units and about 90% or more of D-lactic acid unit, and has an optical purity of not lower than about 80%, while the latter comprises 10% to 90% of D-lactic acid units and 90% to 10% of L-lactic acid units, and has an optical purity of not higher than about 80%.

A polylactic acid resin used in the present invention is preferably a polylactic acid resin that is a mixture comprising 100 to 60 parts by weight of crystalline polylactic acid having an optical purity of not lower than 85% and 0 to 40 parts by weight of amorphous polylactic acid having an optical purity of not higher than 80%. Particularly preferably, a polylactic acid resin is a mixture of 95 to 60 parts by weight of crystalline polylactic acid having an optical purity of not lower than 85% and 5 to 40 parts by weight of amorphous polylactic acid having an optical purity of not higher than 80%. The resins having the compositions in these ranges are advantageous as an oriented film with superior heat sealing property while having the heat shrinkage suppressed to a low level after heat treatment, can be easily obtained therefrom. If the content of crystalline polylactic acid having an optical purity of not lower than 85% is less than 60 parts by weight, heat shrinkage tends to increase.

The hydroxycarboxylic acid(s), a monomer(s) to be used as a copolymerization component with lactic acid, include such as glycolic acid, 3-hydroxybutyric acid, 4-hydroxybutyric acid, 3-hydroxyvaleric acid, 4-hydroxyvaleric acid and 6-hydroxycaproic acid.

The aliphatic cyclic ester(s) includes glycolide, lactide, β-propiolactone, γ-butyrolactone, δ-valerolactone, ε-caprolactone and substituted lactones with various groups such as a methyl group, and the like. The dicarboxylic acid(s) includes succinic acid, glutanic acid, adipic acid, azelaic acid, sebacic acid, terephthalic acid and isophthalic acid, and the like. The polyvalent alcohol(s) includes aromatic polyvalent alcohols, such as bisphenol/ethylene oxide adducts; aliphatic polyvalent alcohols, such as ethylene glycol, propylene glycol, butanediol, hexanediol, octanediol, glycerin, solbitan, trimethylolpropane, neopentyl glycol; and ether glycols, such as diethylene glycol, triethylene glycol, polyethylene glycol, polypropylene glycol.

Biodegradable plastics, such as aliphatic polyesters, may be added to the above-described polylactic acid. The amount to be added, however, should be not higher than 50% by weight so as not to impair the properties of the polylactic acid resin itself.

As a method of polymerizing the polylactic acid resin, a known method, such as a polycondensation method, a ring opening polymerization method and the like can be employed. A method for increasing molecular weight by using a binder, such as polyisocyanate, polyepoxy compound, acid anhydride and polyfunctional acid chloride, can also be employed. The weight average molecular weight of the polylactic acid resin is preferably in the range from 20,000 to 1,000,000, more preferably in the range from 30,000 to 500,000. If the molecular weight is within these ranges, the melt viscosity will be in a suitable range and, thus, a stable film can be obtained even by using usual processing machine.

The biaxially oriented film of a polylactic acid resin of the present invention has a storage modulus E' at 80° C. of from 10 MPa to 3,000 MPa at least in one of the MD and TD directions, as determined by the test method for temperature dependency of dynamic viscoelasticity, in accordance with JIS K7198 (method A). It is preferable that the storage modulus is in the above range at least in the MD direction, more preferably in both of the MD and TD directions. Since films are heated up to around 80° C. by hot air for drying in a drying step after coating with an antistatic agent, a lubricant, an antiblocking agent or the like, if the storage modulus E' at 80° C. of a film is less than 10 MPa, the film will have deformations, such as film elongation by tension exerted on film in drying process, which makes it difficult to obtain a good state of roll of film. On the other hand, a film of polylactic acid resin with a storage modulus E' thereof at 80° C. of higher than 3,000 MPa is practically difficult to obtain. Preferable range of E' of a film at 80° C. is from 50 MPa to 1,000 MPa, and particularly preferable range is from 70 MPa to 500 MPa. A film with E' at 80° C. of not higher than 300 MPa is preferable as it has the superior heat sealing property.

The biaxially oriented film of a polylactic acid resin of the present invention has heat shrinkage, in both the MD and TD directions, of not higher than 10%, upon heating at 80° C. for 10 seconds. The film with heat shrinkage over 10%, upon heating at 80° C. for 10 seconds, exhibits heat shrinkage by hot air for drying in drying process after coating with an antistatic agent, a lubricant, an antiblocking agent or the like, to have wrinkles on the film surface. It is therefore difficult to obtain a film with good appearance. The heat shrinkage upon heating at 80° C. for 10 seconds is preferably not higher than 5%, and particularly preferably not higher than 3%.

Furthermore, the biaxially oriented film of a polylactic acid resin of the present invention is required to have a tear strength in the width direction of the film (TD direction) of 10 to 200 mN, as determined in accordance with JIS K7128 (method B). A film with the tear strength in the TD direction over 200 mN has inferior high-speed cutting property and, thus, is not adaptable to high-speed bag manufacturing equipment and high-speed fabrication machine, in particular to high-speed affixing machine for envelope windows. On the other hand, a film with said tear strength lower than 10 mN has undesired film breaks at high frequency during the slitting work. Preferable range of said tear strength is from 20 to 150 mN, and particularly preferable range is from 20 to 100 mN.

Furthermore, the biaxially oriented film of a polylactic acid resin of the present invention preferably has a heat of fusion, ΔHm, at the crystal melting peak present at a temperature not lower than 100° C., of 15 to 30 J/g, in particular, 22 to 28 J/g, as determined by a differential scanning calorimeter (DSC) with the temperature being increased from 0° C. to 200° C. in accordance with JIS K7122. A film with the above value not higher than 30 J/g is superior in heat sealing property, while a film with the value not smaller than 15 J/g exhibits little heat shrinkage and, thus, hardly shrinks during hot air drying after coating.

The biodegradable film of the present invention has a haze of preferably not higher than 5%, more preferably not higher than 3%, and particularly preferably not higher than 2%, as measured by a hazemeter (ASTM D 1003-95). If the haze is not lower than 5%, the transparency will be reduced to make it difficult to see contents in the bag. In the case of general packaging film, it is difficult to see contents clearly through the film, and thus impairs the appearance and value as a commercial product. In the application of the outlook window envelopes, in particular, if the haze is not lower than 5%, the transparency will be reduced to frequently cause reading error of the information recorded in a bar code.

The polylactic acid resin film of the present invention may be compounded with, in addition to the above-described resins, known additives such as other biodegradable resins, heat stabilizers, antioxidants and UV absorbers, in an amount not to impair the requirements in and the characteristics of, the present invention. In the case of mixing a resin which increases the haze, the maximum amount to be compounded should be 5% based on the polylactic acid resin.

The thickness of a film of the present invention is preferably in the range from 5 to 100 μm, more preferably in the range from 7 to 50 μm. In particular, the thickness of film for envelope windows is preferably in the range from 20 to 40 μm to provide stiffness suitable for affixing machine for the outlook window envelopes.

Hereinbelow, a method for producing a biaxially oriented film comprising not lower than 50% by weight of a polylactic acid resin of the present invention will be described. First, a raw material resin(s) is fed into a single screw or twin screw extruder and melt mixed. The melt is then extruded through a T die, a cylinder die or an I die and quenched to be in an amorphous-like state. The melt extrusion temperature range at this time is, in general, preferably from 100 to 250° C. The quenching temperature is preferably from 0 to 60° C. The resin is then biaxially drawn by a conventionally known drawing method including a roll method, a tenter method, a tubular method or the like. Among these drawing methods, the tenter method is preferable due to easiness to obtain a oriented film of the present invention because drawing ratios in the MD and TD directions can be independently controlled.

Drawing ratio in the drawing procedure may be selected from the range of 1.5 to 10 each for the longitudinal direction (MD direction) and the width direction (TD direction) of the film. The drawing ratio is preferably at least 4 in the TD direction, in view of the enhancement of film strength and film cutting property in the TD direction by imparting orientation, more preferably at least 2 in the MD direction and at least 4 in the TD direction, particularly preferably from 2.0 to 4.5 in the MD direction and from 4.5 to 7 in the TD direction. The ratios are further particularly preferably from 2.5 to 3.5 in the MD direction and from 5.2 to 7 in the TD direction. The ratio of (drawing ratio in the TD direction)/(drawing ratio in the MD direction) is preferably larger than 2.0. By drawing the film in the TD direction at a ratio of 4 or more, the tear strength in the TD direction falls within a specified range and the high-speed film cutting property is improved. Preferable drawing temperature is from 65° C. to 90° C.

To obtain the biaxially oriented film of a polylactic acid resin of the present invention, the film is heat treated at a temperature range not lower than the glass transition temperature and not higher than the melting point of the polylactic acid resin used as a raw material, after the biaxial drawing. When a tubular method is employed, a heat treatment method wherein a film is heated by external hot air and the like, while being kept in tensed state by maintaining the internal pressure by sealing internal air, is usually employed. In the tenter method, a heat treatment method wherein a film is passed through a heat treatment zone with the film being hold with clips. Preferably, the film is heat treated at a temperature of not lower than the drawing temperature but not higher than the melting point of a film for a period not shorter than 1 second depending on the treatment temperature, and particularly preferably heat-treated at a temperature range not lower than 100° C. and not higher than the melting point for a period not shorter than 2 seconds. If the temperature is too low or if the heat treatment time is too short, the heat shrinkage of the drawn film may exceed 10%, upon heating at 80° C. for 10 seconds. Heat treatment in the state where the tension in the TD direction and/or the MD direction is relaxed is effective to reduce the heat shrinkage. Heat treatment under excessive relaxation, however, tends to increase tear strength in the TD direction resulting in lower high-speed cutting property. Thus, it is preferable to carry out the heat treatment in the state where the tension to the film is relaxed to such an extent that the tear strength in the TD direction becomes not higher than 200 mN, in order to obtain a film with superior high-speed cutting property.

The film of a polylactic acid resin is more hydrophilic than films based on a polyolefin resin or a polystyrene resin. However, it is preferable to impart further hydrophilicity to the film by a method such as corona treatment of the film surface to be coated, for uniform coating of the biaxially oriented film of a polylactic acid resin of the present invention with an antistatic agent, a lubricant, an antiblocking agent or the like. This hydrophilicity imparting treatment improves the uniformity of the coating and effectively provides antistatic property or lubrication effect. Said hydrophilicity imparting treatment is preferably carried out so that the surface tension becomes in the range from 400 μN/cm to 600 μN/cm.

The biaxially oriented film of a polylactic acid resin of the present invention is biodegradable and useful as films for bags, packaging and various containers with windows, to which an antistatic agent, a lubricant, an antiblocking agent or the like is applied, since it has superior coating adaptability and high-speed cutting property. It is especially suitable for films for the outlook window envelopes. The film, when used for bags or packaging, preferably has a tensile strength, as mechanical strength, of not lower than 20 MPa and a tensile elongation of from 20 to 1,000%. These values are specified depending on the applications.

EXAMPLES

The present invention will now be explained by way of Examples and Comparative Examples.

First, evaluation methods used in the Examples and Comparative Examples are described below.

(1) Composition of D- and L-Lactic Acids in Polylactic Acid Polymer and Optical Purity The optical purity of polylactic acid polymer is calculated by the following equation based on a composition ratio of L-lactic acid units and/or D-lactic acid units composing the polylactic acid, as described above.

optical purity(%)=|[L]−[D]| wherein [L]+[D]=100, and |[L]−[D]|represents an absolute value of [L]−[D].

Composition ratio of L-lactic acid units and/or D-lactic acid units composing polylactic acid polymer is determined by:

preparing a hydrolyzed sample (liquid) by alkaline decomposition of a sample with 1N—NaOH, followed by neutralizing with 1N—HCl and adjusting the concentration with distilled water;

passing the hydrolyzed sample through a high performance liquid chromatography (HPLC: LC-10A-VP) from Shimadzu Corp. to obtain an area ratio of detected peaks (area is measured by a vertical line method) corresponding to L-lactic acid and D-lactic acid at 254 nm UV;

obtaining a weight ratio of L-lactic acid [L] (unit: %) composing the polylactic acid polymer and a weight ratio of D-lactic acid [D] (unit: %) composing the polylactic acid polymer from the area ratio; and taking the mean (rounded) of three measurement values per polymer as the measurement value of the composition ratio.

(2) Weight Average Molecular Weight Mw of Polylactic Acid Polymer

The weight average molecular weight Mw was determined using a gel permeation chromatography equipment (GPC: data processing part; GPC-8020, detection part; RI-8020) from Toso Co., Ltd., under the following measuring conditions, as polystyrene equivalent value based on the standard polystyrene. Three measurement values per polymer were arithmetically averaged and rounded and the average was employed as the measurement value.

Column: connected column of Shodex K-805 and K-801 from Showa Denko Co., Ltd. (7.8 mm diameter×60 cm length)

Eluate: chloroform

Concentration of sample solution: 0.2 wt/vol %

Volume of sample solution charged: 200 μL

Flow rate of solvent: 1 ml/min.

Column/detector temperature: 40° C.

(3) Glass Transition Temperature (Tg), Melting Point (Tm) and Crystal Heat of Fusion (ΔHm)

A sample was heated from 0° C. to 200° C. in differential scanning calorimeter (DSC) in accordance with JIS-K7121 and JIS-K-7122 to measure Tg, Tm and heat of fusion ΔHm of crystal melting peak, present at a temperature not lower than 100° C. That is, about 10 mg of test sample was cut out from a sample film conditioned (by leaving to stand for 1 week) in the standard state (23° C., 65% RH) and the DSC curve of the sample was drawn with a differential scanning calorimeter model DSC-7 (heat flux type DSC) from Perkin-Elmer Inc., with nitrogen gas being flowed at a rate of 25 ml/min and temperature being increased from 0° C. to 200° C. at a rate of 10° C./min. Melting point Tm (° C.) was determined from a top of melting (endothermic) peak in the temperature increasing process, crystal heat of fusion ΔHm (J/g) from an endothermic peak area, and Tg (° C.) from a crossing point (midpoint glass transition temperature) of step-wise changing part of a curve in the temperature increasing process and a line with equal distance in vertical axis direction, from extended lines of both baselines. Four measurement values per polymer were arithmetically averaged and rounded and the average was employed as the measurement value.

(4) Drawing Ratios in the MD Direction and TD Direction

Drawing ratios in the MD direction and TD direction were determined by the following equations.

Drawing ratio in the MD direction=(film flow rate after drawing in the MD direction)/(original sheet flow rate before drawing in the MD direction)

Drawing ratio in the TD direction=(film width after drawing in the TD direction)/(original sheet width before drawing in the TD direction)

In a tenter method, film or sheet width means a width between clips before and after drawing in the TD direction.

(5) Storage Modulus E' (MPa)

Storage modulus E' was measured in accordance with JIS K7198 (method A). Namely, it was measured by a tensile vibration method under the conditions of frequency of 1 Hz and temperature increasing from 20° C. to 160° C. at a rate of 2° C./min, with a test piece having a width of 7 mm being held so that the distance between the chucks was 22 mm, using RSA-II from Rheometric Scientific F.E. Inc.

(6) Heat Shrinkage (%)

A test piece with 150 mm×150 mm was cut out from a film sample in such a manner that one film side was parallel to the MD direction. On the test piece a square of 100 mm×100 mm was drawn in such a manner that one side thereof was parallel to the MD direction. In the square, two sets of nine straight lines were drawn at 10 mm intervals with the sets being in parallel to the MD direction and the TD direction, respectively, to prepare the test piece on which the squares of 10 mm×10 mm were drawn. The test piece was placed in a hot air drying chamber set at 80° C. for 10 seconds and allowed to shrink freely. Heat shrinkage was determined by taking the mean of the values from the following equation and the dimensions of 11 lines drawn in the MD direction and TD direction.

Heat shrinkage (%)=[(line dimension before heat shrinkage)−(line dimension after heat shrinkage)]/(line dimension before heat shrinkage)× 100

(7) Haze (%)

A test piece of square film with a size of 50 mm×50 mm and a thickness of 25 μn was cut out from a film sample conditioned (by leaving to stand for 1 week at 23° C.) under the standard conditions (23° C., 65% RH) Haze (%) was measured at the standard condition in accordance with ASTM D1003-95, using a hazemeter, model NDH-1001DP from Nippon Denshoku Ind. Co., Ltd. Six measurement values per film type were arithmetically averaged and rounded to obtain the haze.

(8) Tear Strength (mN)

Tear strengths (mN) in the MD direction and TD direction of a film was measured in accordance with JIS K7128 (method B).

(9) Coating Adaptability

Coating adaptability was evaluated by using a coating composition improving antistatic property and lubricity (consisting of 50% by weight of "TSF-4441" from Toshiba Silicone Co., Ltd. as a polyether-modified silicone and 50% by weight of "Nymeen F-215", polyoxyethylene-alkyl(coconut oil)amine from NOF Corp. as a surfactant) as a surface treatment agent. First, the film surface to be coated was subjected to corona treatment so as to impart a surface tension of 500 μN/cm, using model AGI-060MD from Kasuga Electric Machine Co., Ltd. The film surface was then coated with an aqueous solution of said coating composition having a concentration of the surface treatment agent of 0.3% by weight, using a spray coater. The film was passed through a hot air dryer set at 90° C. to remove moisture. The coating amount was controlled to be 2.5 mg/m² by adjusting the conditions of the spray coater (air pressure and line speed). Coating adaptability was evaluated according to the following criteria from the film coating state and the heat shrink state after the coating and hot air drying.

⊚: a film having a good coating, showing uniform coating without generation of wrinkle, film extension, sagging, or the like caused by heat shrink.

○: a film having a coating practically usable without problem, showing uniform coating and a little generation of wrinkles, film extension, sagging, or the like caused by heat shrink.

X: a film not suitable for practical use, showing generation of much wrinkles, film extension, sagging, or the like caused by heat shrink.

(10) High-Speed Cutting Property and Envelope Window Affixing Adaptability

To evaluate high-speed film cutting property and envelope window affixing adaptability, the upper limit of practically possible cutting speed at which window can be affixed without displacement was measured by affixing test for envelope window on a window frame of 50×90 mm on an envelope of 135×235 mm (made of paper), under various cutting speeds, using envelope window affixing machine (model HELIOS 202 from WINKLER+DUNNERBIER), followed by visual inspection of displacement with respect to the a envelope window frame. High-speed cutting property and envelope window affixing adaptability were evaluated according to the following criteria based on these test results.

⊚: a film that can be cut at a cutting speed of 600 sheets or more/min and affixed without causing displacement ○-⊚: a film that can be cut at a cutting speed of 500 to 600 sheets/min and affixed without causing displacement ○: a film that can be cut at a cutting speed of 400 to 500 sheets/min and affixed without causing displacement X: a film that cannot be cut at a cutting speed of not lower than 400 sheets/min or a film that causes displacement due to delay, even if cutting at such a speed is possible

(11) Tensile Strength (MPa)

Tensile strengths (MPa) of the film in the MD direction and TD direction were measured in accordance with ASTM D882.

(12) Tensile Elongation (%)

Tensile elongations (%) of the film in the MD direction and TD direction were measured in accordance with ASTM D882.

(13) Heat Sealing Property

Three test pieces of rectangular film with a length of 250 mm in the longitudinal direction (the MD direction)×a width of 25.4 mm (1 inch) were cut out from a film sample conditioned (by leaving to stand for 1 week at 23° C.) under the standard condition (23° C., 65% RH). Hot tack strength (HT strength; unit: N/1 inch width) was measured in accordance with ASTM-F1921-98, as a peak strength observed within 1,000 mS (=1 sec) after die opening, using a hot tack measurement instrument from Theller Ltd. under the following sealing conditions.

Shape of the upper die: metal die, V type of 60 degree (tip cross-section of half-circle shape with R=1 mm, 5.25 inch length)

Shape of the lower die: die with rubber lining, plain type (0.5 inch width×5.25 inch length)

Dimension of seal surface: 1 inch×1 mm seal temperature: (upper die) 110° C., (lower die) 25° C.

seal time: 1,000 mS seal pressure: 13±1 MPa

Heat seal property of a film was evaluated by hot tack strength (HT strength: peak strength, unit: N/1 inch width), corresponding to high-speed heat seal strength in packaging machine or bag making machine, in view of continuous heat seal stability not to cause breaking out of the content from the seal part or partial peeling off (or breakage) of seal part, when it is continuously subjected to heat sealing process from original wound film state to form packaging or bags by packaging machine or bag making machine, according to the following criteria.

⊚: a film having a hot tack strength of not lower than 7N/1 inch width and sufficient strength and no breaking out of its content or seal line failure, showing a very good state ○: a film having a hot tack strength of not lower than 5N/1 inch width which is at the level where the film can be practically used without problem, and no breaking out of its content or seal line failure X: a film having a hot tack strength of lower than 5N/1 inch width wherein seal line may be peeled off (broken) and the content may be broken out Polylactic acid resins used in the following Examples 1 to 16 and Comparative Examples 1 to 6 were crystalline polylactic acids (a), (b) and amorphous polylactic acid (c) having the weight average molecular weights and the optical purities shown in Table 1, obtained by the polymerization with the catalyst amount, polymerization conditions, monomer composition and the like being controlled in accordance with Examples 1B to 7B in JP-A-4-504731. However, the compositions of the polylactic acid resins in the present invention should not be limited thereto.

TABLE 1

|  | Weight average Mw | Content of D-lactic acid | Optical purity | Tg | Tm |
| --- | --- | --- | --- | --- | --- |
| Crystalline polylactic acid (a) | 250,000 | 4.5% | 91% | 57° C. | 153° C. |
| Crystalline polylactic acid (b) | 270,000 | 1.5% | 97% | 58° C. | 170° C. |
| Amorphous polylactic acid (c) | 280,000 | 13.0% | 74% | 53° C. | None |

Examples 1 to 11 and Comparative Examples 1 to 6

In Examples 1 to 11 and Comparative Examples 1 to 6, pellets of crystalline polylactic acid (a) or (b) and amorphous polylactic acid (c) shown in Table 1 were dry blended to the compositions shown in Table 2, followed by melt blending using a co-rotating twin screw extruder, extruding molten resins at a resin temperature of 200° C. through a T-die, quenching by a casting roll kept at a temperature of 35° C. to obtain substantially amorphous sheets. Then the sheets obtained were heated at 75° C., roll-drawn in the MD direction at the drawing ratios shown in Table 2, and then tenter-drawn in the TD direction at 85° C. at the drawing ratios shown in Table 2. Thereafter, all the films, except for the film in Comparative Example 2, were introduced into a heat treatment zone adjusted to have the temperatures shown in Table 2 to subject the films to the heat-treatments for the periods shown in Table 2, with the films being kept in the drawn and held state. Thereafter, the films were cooled to a room temperature to obtain biaxially oriented films of a polylactic acid resin with a thickness of 25 μm. In Comparative Example 2, a film was cooled to a room temperature without undergoing the heat treatment, to obtain a biaxially oriented film of a polylactic acid resin with a thickness of 25 μm. Evaluation results of the physical properties of the films obtained are shown in table 2.

TABLE 2-1

|  |  | Example 1 | Example 2 | Example 3 | Example 4 | Example 5 | Example 6 | Example 7 | Example 8 | Example 9 | Example 10 | Example 11 |
| --- | --- | --- | --- | --- | --- | --- | --- | --- | --- | --- | --- | --- |
| Blend ratio (wt parts) | Crystalline polylactic acid (a) | 100 | 100 |  | 90 | 80 |  | 80 | 70 |  |  |  |
|  | Crystalline polylactic acid (b) |  |  | 100 |  |  | 80 |  |  | 60 | 50 | 40 |
|  | Amorphous polylactic acid (c) | 0 | 0 | 0 | 10 | 20 | 20 | 20 | 30 | 40 | 50 | 60 |
| Drawing ratio in the MD direction (times) |  | 2.5 | 3.0 | 3.0 | 2.5 | 3.0 | 3.5 | 2.5 | 2.5 | 3 | 3 | 2.5 |
| Drawing ratio in the TD direction (times) |  | 6 | 5.1 | 4.5 | 6.2 | 6.2 | 5.1 | 4.5 | 6.3 | 5.5 | 6.0 | 6.0 |
| Heat treatment conditions | Temp. (° C.) | 140 | 140 | 140 | 140 | 140 | 140 | 130 | 130 | 140 | 140 | 130 |
|  | Time (sec) | 3 | 3 | 3 | 3 | 3 | 3 | 3 | 3 | 3 | 3 | 5 |
| Storage modulus E' (MPa) | MD direction | 360 | 370 | 490 | 210 | 160 | 220 | 150 | 110 | 90 | 60 | 30 |
|  | TD direction | 160 | 150 | 250 | 95 | 80 | 100 | 70 | 60 | 70 | 40 | 30 |
| Heat shrinkage | MD direction | 0.5 | 0.5 | 0.5 | 0.7 | 0.7 | 1.0 | 1.0 | 2.5 | 2.5 | 4.5 | 8.0 |

TABLE 2-1-continued

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| at 80° C. for 10 sec (%) | TD direction | 1.0 | 0.5 | 0.3 | 1.2 | 1.5 | 1.5 | 2.5 | 3.0 | 3.5 | 4.5 | 8.5 |
| Heat of crystal fusion ΔHm (J/g) |  | 31 | 31 | 40 | 28 | 25 | 35 | 25 | 24 | 26 | 25 | 20 |
| Haze (%) |  | 0.9 | 0.8 | 1 | 0.7 | 0.5 | 0.9 | 0.5 | 0.5 | 0.7 | 0.6 | 0.5 |
| Tear strength (mN) | TD direction | 55 | 80 | 190 | 70 | 80 | 140 | 180 | 79 | 81 | 80 | 130 |
| Coating adaptability |  | ◎ | ◎ | ◎ | ◎ | ◎ | ◎ | ◎ | ◎ | ○ | ○ | ○ |
| High speed cutting property (envelope window affixing adaptability) |  | ◎ | ◎ | ○ | ◎ | ◎ | ○-◎ | ○ | ◎ | ◎ | ◎ | ○-◎ |

TABLE 2-2

|  |  | Comp. Example 1 | Comp. Example 2 | Comp. Example 3 | Comp. Example 4 | Comp. Example 5 | Comp. Example 6 |
|---|---|---|---|---|---|---|---|
| Blend ratio (wt parts) | Crystalline polylactic acid (a) | 100 | 100 |  | 80 |  |  |
|  | Crystalline polylactic acid (b) |  |  | 90 |  | 50 | 30 |
|  | Amorphous polylactic acid (c) | 0 | 0 | 10 | 20 | 50 | 70 |
| Drawing ratio in the MD direction (times) |  | 3.0 | 3.0 | 2.5 | 3.0 | 2.5 | 2.5 |
| Drawing ratio in the TD direction (times) |  | 3.0 | 6.0 | 3.5 | 2.5 | 3.8 | 6.0 |
| Heat treatment conditions | Temp. (° C.) | 140 | Nil | 140 | 140 | 130 | 130 |
|  | Time (sec) | 3 |  | 3 | 3 | 5 | 5 |
| Storage modulus E' (MPa) | MD direction | 370 | 70 | 290 | 150 | 40 | 4 |
|  | TD direction | 160 | 140 | 130 | 70 | 25 | 7 |
| Heat shrinkage at 80° C. for 10 sec (%) | MD direction | 0.5 | >20 | 0.8 | 1.0 | 5.0 | 13 |
|  | TD direction | 0.5 | >20 | 0.5 | 1.2 | 6.0 | 15 |
| Heat of crystal fusion ΔHm (J/g) |  | 31 | 30 | 38 | 25 | 25 | 16 |
| Haze (%) |  | 0.8 | 0.7 | 0.9 | 0.5 | 0.6 | 0.5 |
| Tear strength (mN) | TD direction | 280 | 50 | 250 | 300 | 220 | 170 |
| Coating adaptability |  | ◎ | X | ◎ | ◎ | ○ | X |
| High speed cutting property (envelope window affixing adaptability) |  | X | ◎ | X | X | X | ○ |

As shown in Table 2, the biaxially oriented films of a polylactic acid resin obtained in Examples 1 to 11 are found to be superior in the coating adaptability, high-speed cutting property and envelope window affixing adaptability.

Examples 12 to 16

In Examples 12 to 16, pellets of crystalline polylactic acid (a) or (b) and amorphous polylactic acid (c) shown in Table 1 were dry blended to the compositions shown in Table 3, followed by melt blending using a co-rotating twin screw extruder, extruding molten resins at a resin temperature of 200° C. through a T-die, quenching by a casting roll kept at a temperature of 35° C. to obtain substantially amorphous sheets. Then the sheets obtained were heated at 75° C., roll-drawn in the MD direction at the drawing ratios shown in Table 3, and then tenter-drawn in the TD direction at 85° C. at the drawing ratios shown in Table 3. Then, these films were introduced into a heat treatment zone adjusted to have the temperatures shown in Table 3 to subject the films to the heat treatment for the periods shown in Table 3, with the films being kept in the drawn and held state. Thereafter, the films were cooled to a room temperature to obtain biaxially oriented films of the polylactic acid resins with a thickness of 20 μm. Evaluation results of physical properties of the films obtained are shown in Table 3.

TABLE 3

|  |  | Example 12 | Example 13 | Example 14 | Example 15 | Example 16 |
|---|---|---|---|---|---|---|
| Blend ratio (wt parts) | Crystalline polylactic acid (a) | 100 |  | 90 | 80 |  |
|  | Crystalline polylactic acid (b) |  | 100 |  |  | 70 |
|  | Amorphous polylactic acid (c) | 0 | 0 | 10 | 20 | 30 |
| Drawing ratio in the MD direction (times) |  | 2.5 | 2.5 | 2.3 | 2.6 | 2.5 |
| Drawing ratio in the TD direction (times) |  | 5.5 | 5.1 | 5.2 | 5.5 | 4.8 |
| Heat treatment conditions | Temp. (° C.) | 140 | 140 | 130 | 130 | 130 |
|  | Time (sec) | 3 | 3 | 3 | 3 | 3 |
| Storage modulus E' (MPa) | MD direction | 360 | 460 | 200 | 150 | 150 |
|  | TD direction | 150 | 260 | 100 | 80 | 80 |
| Heat shrinkage at 80° C. for 10 sec (%) | MD direction | 0.5 | 0.5 | 0.7 | 1.0 | 1.2 |
|  | TD direction | 1.0 | 0.5 | 1.3 | 1.7 | 1.8 |
| Heat of crystal fusion ΔHm (J/g) |  | 31 | 41 | 28 | 25 | 32 |
| Haze (%) |  | 0.6 | 0.7 | 0.5 | 0.4 | 0.5 |
| Tear strength (mN) | TD direction | 40 | 90 | 55 | 60 | 110 |
| Coating adaptability |  | ◎ | ◎ | ◎ | ◎ | ◎ |
| High-speed cutting property (envelope window affixing adaptability) |  | ○-◎ | ○-◎ | ○-◎ | ○-◎ | ○ |

As shown in Table 3, the biaxially oriented films of a polylactic acid resin obtained in Examples 12 to 16 are found to be superior in the coating adaptability, high-speed cutting property and envelope window affixing adaptability.

The polylactic acid resins used in the following Examples 17 to 27 and Comparative Examples 7 to 10 were crystalline polylactic acid (a) and amorphous polylactic acid (b) having the weight average molecular weights and optical purities shown in Table 4, and obtained by polymerization under the controls of catalyst amount, polymerization conditions, monomer composition or the like in accordance with Examples 1B to 7B in JP-A-4-504731. However, the compositions of polylactic acid resins in the present invention should not be limited thereto.

TABLE 4

|  | Weight average Mw | Content of D-lactic acid | Optical purity | Tg | Tm |
|---|---|---|---|---|---|
| Crystalline polylactic acid (a) | 290,000 | 4.5% | 91% | 59° C. | 153° C. |
| Amorphous polylactic acid (b) | 300,000 | 12.5% | 75% | 53° C. | None |

Examples 17 to 25, 27 and Comparative Examples 7 to 9

In Examples 17 to 25, 27 and Comparative Examples 7 to 9, pellets of crystalline polylactic acid (a) and amorphous polylactic acid (b) shown in Table 4 were dry blended to the composition shown in Table 5, followed by melt blending using co-rotating twin screw extruder, extruding the molten resins at a resin temperature of 200° C. through a T-die, quenching by a casting roll kept at a temperature of 35° C. to obtain substantially amorphous sheets. Then the sheets obtained were heated at 75° C. and roll-drawn at a drawing ratio of 2.5 in the MD direction, and then at 80° C. tenter-drawn at a drawing ratio of 6 in the TD direction. In Examples 17 to 25, 27 and Comparative Examples 7, the films were then introduced into a heat treatment zone adjusted to have the temperatures shown in Table 3 to subject the films to the heat treatment for the periods shown in Table 5, with the films being kept in the drawn and held state. Thereafter, the films were cooled to a room temperature to obtain biaxially oriented films of the polylactic acid resin with a thickness of 25 μm. In Comparative Example 8 and 9, the films were cooled to a room temperature without undergoing the heat-treatment to obtain biaxially oriented films of the polylactic acid resins with a thickness of 25 μm. Evaluation results of physical properties of the films obtained are shown in table 5.

Example 26

In Example 26, a film was oriented in the same manner as in Examples 17 to 25 and 27, except that polylactic acid (a) and (b) shown in Table 4 were used and that the drawning ratios were 3 in the MD direction and 5.5 in the TD direction as shown in Table 5. The film was then subjected to the heat treatment under the conditions shown in Table 5 and cooled to a room temperature to obtain a biaxially oriented film of a polylactic acid resin with a final thickness of 25 μm by adjusting the degree of die-lip opening. Evaluation results of the physical properties of the films obtained are shown in table 5.

Comparative Example 10

In Comparative Example 10, a film having the same composition as in Example 27 was drawn in the same manner as in Example 27, except that the film was drawn at ratios of 2.5 in the MD direction and 3 in the TD direction as shown in Table 5. The film was subjected to the heat treatment under the conditions shown in Table 5 and cooled to a room temperature to obtain a biaxially oriented film of a polylactic acid resin with a final thickness of 25 μm by adjusting the degree of die-lip opening. Evaluation results of the physical properties of the film obtained are shown in table 5.

TABLE 5-1

|  |  | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|
| Blend ratio (wt parts) | Crystalline polylactic acid (a) | 80 | 75 | 70 | 60 | 50 | 40 | 95 | 90 | 85 | 80 | 100 |
|  | Amorphous polylactic acid (b) | 20 | 25 | 30 | 40 | 50 | 60 | 5 | 10 | 15 | 20 | 0 |
| Drawing ratio in the MD direction (times) |  | 2.5 | 2.5 | 2.5 | 2.5 | 2.5 | 2.5 | 2.5 | 2.5 | 2.5 | 3.0 | 2.5 |
| Drawing ratio in the TD direction (times) |  | 6 | 6 | 6 | 6 | 6 | 6 | 6 | 6 | 6 | 5.5 | 6 |
| Heat treatment conditions | Temp. (° C.) | 130 | 130 | 130 | 130 | 120 | 120 | 140 | 140 | 140 | 140 | 140 |
|  | Time (sec) | 3 | 3 | 3 | 3 | 5 | 5 | 3 | 3 | 3 | 3 | 3 |
| Storage modulus E' (MPa) | MD direction | 150 | 130 | 110 | 70 | 40 | 20 | 250 | 210 | 180 | 170 | 350 |
|  | TD direction | 70 | 65 | 60 | 50 | 25 | 20 | 110 | 95 | 80 | 65 | 150 |
| Heat shrinkage at 80° C. for 10 sec (%) | MD direction | 1.0 | 1.8 | 2.5 | 3.8 | 4.5 | 8.0 | 0.5 | 0.7 | 0.8 | 1.0 | 0.5 |
|  | TD direction | 2.5 | 2.5 | 3.0 | 4.5 | 4.5 | 8.5 | 1.0 | 1.2 | 1.5 | 1.2 | 1.0 |
| Heat of crystal fusion ΔHm (J/g) |  | 25 | 24 | 23 | 21 | 18 | 16 | 30 | 28 | 26 | 25 | 32 |
| Haze (%) |  | 0.5 | 0.4 | 0.4 | 0.3 | 0.3 | 0.4 | 0.8 | 0.7 | 0.6 | 0.5 | 0.9 |
| Tear strength (mN) | TD direction | 80 | 80 | 79 | 81 | 75 | 130 | 75 | 79 | 79 | 90 | 79 |
| Tensile strength (MPa) | MD direction | 95 | 90 | 90 | 80 | 75 | 69 | 100 | 100 | 100 | 110 | 110 |
|  | TD direction | 175 | 170 | 160 | 140 | 125 | 120 | 180 | 180 | 180 | 180 | 190 |
| Tensile elongation (%) | MD direction | 190 | 190 | 190 | 200 | 210 | 220 | 190 | 190 | 190 | 180 | 190 |
|  | TD direction | 90 | 90 | 90 | 100 | 100 | 110 | 80 | 80 | 80 | 100 | 80 |
| Coating adaptability |  | ◎ | ◎ | ◎ | ○ | ○ | ○ | ◎ | ◎ | ◎ | ◎ | ◎ |
| Heat seal property (hot tack strength/inch width) |  | ◎ 9 | ◎ 10 | ◎ 11 | ◎ 13 | ◎ 15 | ◎ 17 | ○ 5 | ◎ 7 | ◎ 8 | ◎ 9 | X 2 |
| High speed cutting property (envelope window affixing adaptability) |  | ◎ | ◎ | ◎ | ◎ | ◎ | ○ | ◎ | ◎ | ◎ | ◎ | ◎ |

TABLE 5-2

|  |  | Comp. Example 7 | Comp. Example 8 | Comp. Example 9 | Comp. Example 10 |
|---|---|---|---|---|---|
| Blend ratio (wt parts) | Crystalline polylactic acid (a) | 30 | 100 | 80 | 100 |
|  | Amorphous polylactic acid (b) | 70 | 0 | 20 | 0 |
| Drawing ratio in the MD direction (times) |  | 2.5 | 2.5 | 2.5 | 2.5 |
| Drawing ratio in the TD direction (times) |  | 6 | 6 | 6 | 3 |
| Heat treatment conditions | Temp. (° C.) | 120 | No treatment | No treatment | 140 |
|  | Time (sec) | 5 |  |  | 3 |
| Storage modulus E' (MPa) | MD direction | 2 | 55 | 40 | 310 |
|  | TD direction | 5 | 250 | 160 | 160 |
| Heat shrinkage at 80° C. for 10 sec (%) | MD direction | >20 | >20 | >20 | 0.5 |
|  | TD direction | 11 | >20 | >20 | 0.8 |
| Heat of crystal fusion ΔHm (J/g) |  | 12 | 31 | 25 | 31 |
| Haze (%) |  | 0.4 | 0.7 | 0.5 | 0.8 |
| Tear strength (mN) | TD direction | 140 | 60 | 65 | 250 |

TABLE 5-2-continued

|  |  | Comp. Example 7 | Comp. Example 8 | Comp. Example 9 | Comp. Example 10 |
|---|---|---|---|---|---|
| Tensile strength (MPa) | MD direction | 65 | 140 | 100 | 100 |
|  | TD direction | 100 | 250 | 200 | 120 |
| Tensile elongation (%) | MD direction | 250 | 200 | 210 | 150 |
|  | TD direction | 130 | 80 | 80 | 160 |
| Coating adaptability |  | X | X | X | ◎ |
| Heat seal property (hot tack strength/inch width) |  | ◎ 19 | X 2 | ◎ 9 | X 2 |
| High speed cutting property (envelope window affixing adaptability) |  | ○ | ◎ | ◎ | X |

As shown in Table 5, the biaxially oriented films of polylactic acid resins obtained in Examples 17 to 27 are found to have tensile strengths of not lower than 60 MPa, that is, the mechanical strength sufficient for films to be used as bags. At the same time, these biaxially oriented films of a polylactic acid resin are found to be superior in the coating adaptability and high-speed cutting property.

INDUSTRIAL APPLICABILITY

The biaxially oriented film of a polylactic acid resin of the present invention is biodegradable as it mainly comprises a polylactic acid resin and has the superior coating adaptability for an antistatic agent, a lubricant, an antiblocking agent or the like, and the superior high-speed cutting property. Therefore, the present invention can provide a biaxially oriented film of a polylactic acid resin suitable for bags, packaging film and plastering film for various windows, particularly those for outlook window envelopes.

The invention claimed is:

1. A window for an outlook window envelope, comprising a biaxially oriented film comprising a polylactic acid resin,
    which has a storage modulus E' at 80° C., in at least one of a longitudinal direction (MD direction) and a width direction (TD direction) of the film, of from 10 MPa to 3,000 MPa, as determined by a test method for temperature dependency of dynamic viscoelasticity in accordance with JIS K7198 (method A);
    a heat shrinkage of not higher than 10%, upon heating at 80° C. for 10 seconds;
    a tear strength in the width direction (TD direction) of 10 to 200 mN, as determined in accordance with JIS K7128 (method B); and
    said film is drawn at a ratio of 5.2–7 in the width direction (TD direction).

2. The window for an outlook window envelope in accordance with claim 1, wherein the storage modulus E' at 80° C., in at least one of the longitudinal direction (MD direction) and the width direction (TD direction) of the film, is within the range from 50 MPa to 1,000 MPa, as determined by the test method for temperature dependency of dynamic viscoelasticity.

3. The window for an outlook window envelope in accordance with claim 1 or 2, wherein the storage modulus E' at 80° C., in at least one of the longitudinal direction (MD direction) and the width direction (TD direction) of the film, is within the range from 10 MPa to 300 MPa, as determined by the test method for temperature dependency of dynamic viscoelasticity; and a heat of fusion, $\Delta Rm$, at the crystal melting peak, present at a temperature not lower than 100° C., is in the range from 15 to 30 J/g, as determined by a differential scanning calorimeter (DSC) with a temperature being increased from 0° C. to 200° C. in accordance with JIS K7122.

4. The window for an outlook window envelope in accordance with claim 1 or 2, wherein the polylactic acid resin is a mixture comprising 95 to 60 parts by weight of crystalline polylactic acid with an optical purity of not lower than 85% and 5 to 40 parts by weight of amorphous polylactic acid with an optical purity of not higher than 80%.

5. The window for an outlook window envelope in accordance with claim 1 or 2, wherein said film is drawn at a ratio of not less than 4 in the width direction (TD direction) of the film, and is subjected to a heat treatment at a temperature not lower than the glass transition temperature (Tg) thereof and not higher than the melting point (Tm) thereof.

6. The window for an outlook window envelope in accordance with claim 1 or 2, wherein said film is drawn at a ratio of 2.3–3.5 in the length direcfion (MD direction).

7. The window for an outlook window envelope in accordance with claim 1 or 2, wherein a ratio of drawing ratio in the TD direction/drawing ratio in the MD direction is larger than 2.0.

8. An outlook window envelope comprising an envelope having an outlook window opening and the window of claim 1 or 2 arranged in said outlook window opening.

9. The window for an outlook envelope in accordance with claim 1, wherein the biaxially oriented film additionally comprises at least one additive selected from the group consisting of biodegradable resins, heat stabilizers, antioxidants and UV absorbers.

* * * * *